No. 773,983. PATENTED NOV. 1, 1904.
W. H. REISNER.
INDICATING SURFACE GAGE.
APPLICATION FILED DEC. 1, 1902. RENEWED MAR. 25, 1904.
NO MODEL.
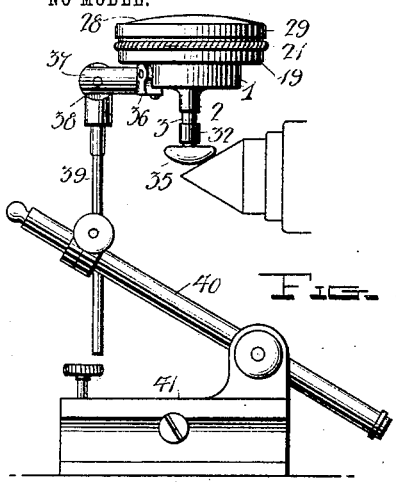
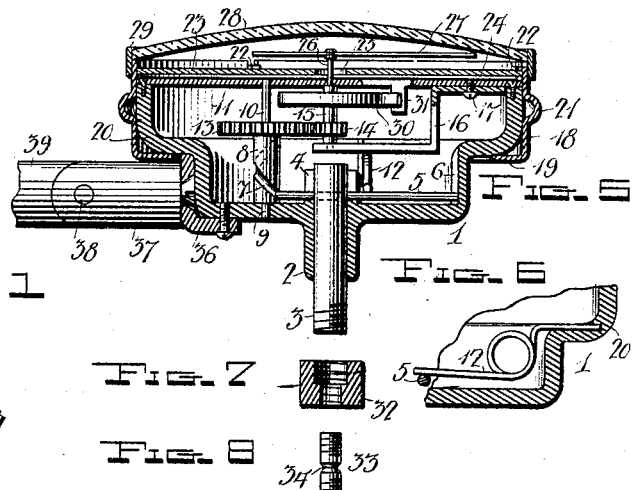
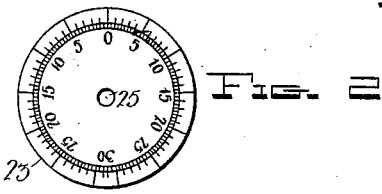
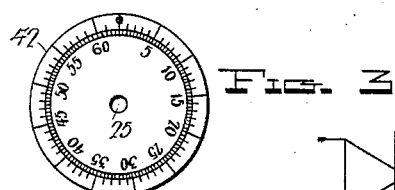
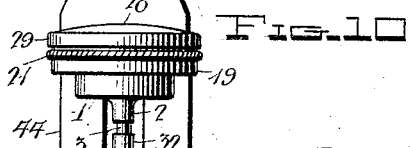
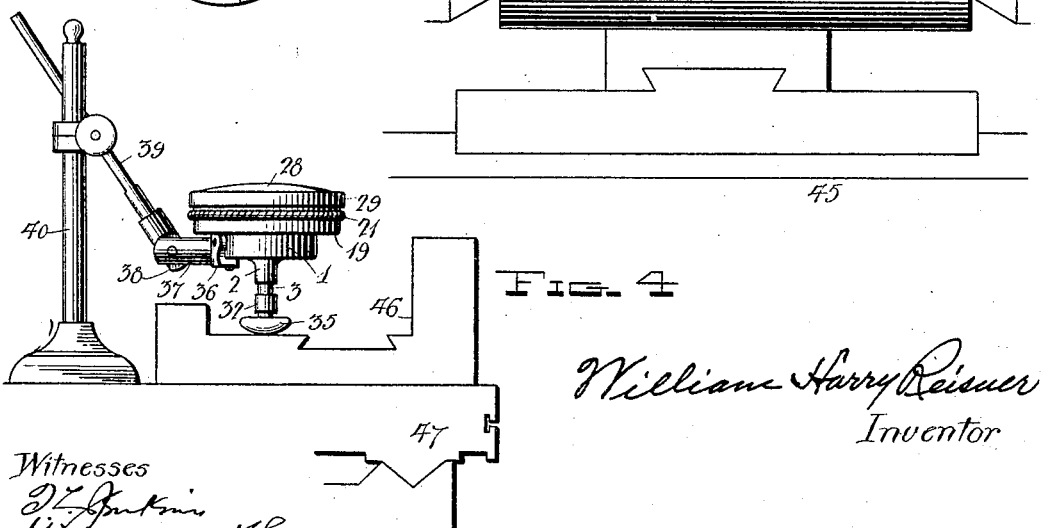
Witnesses
William Harry Reisner
Inventor No. 773,983.

Patented November 1, 1904.

UNITED STATES PATENT OFFICE.

WILLIAM HARRY REISNER, OF HAGERSTOWN, MARYLAND, ASSIGNOR TO W. H. REISNER MANUFACTURING COMPANY, ORGANIZED UNDER THE LAWS OF MARYLAND.

INDICATING SURFACE-GAGE.

SPECIFICATION forming part of Letters Patent No. 773,983, dated November 1, 1904.

Application filed December 1, 1902. Renewed March 25, 1904. Serial No. 200,030. (No model.)

*To all whom it may concern:*

Be it known that I, WILLIAM HARRY REISNER, a citizen of the United States, residing at Hagerstown, in the county of Washington and State of Maryland, have invented certain new and useful Improvements in Indicating Surface-Gages, of which the following is a specification.

My invention relates to indicating surface-gages; and its object is to provide a simple, strong, and easily-operated gage by means of which minute inequalities of size or surface may be detected and indicated definitely in fractional parts of any unit of measure, usually an inch.

A further object of my invention is to produce a measuring instrument of the character stated, including the construction of an adjustable dial the application of which to the determination of refined dimensions and its peculiar advantages are fully hereinbelow set forth.

I accomplish the objects stated by employing and associating certain mechanical parts, as illustrated in the accompanying drawings, of which—

Figure 1 is a side view of the gage applied to the truing of a lathe-center; Figs. 2 and 3, face views of graduated dials used in the gage; Fig. 4, a side view of the invention, showing one of its uses to indicate possible unevenness in the surfaces of a piece of work on a planer-bed; Fig. 5, a vertical cross-section of the gage-box, illustrating the internal mechanism and movable exterior casing; Fig. 6, a side view of the straight and coil spring exerting downward pressure on the traveler-bar; Fig. 7, a sectional view of the screw-collar on the push-pin; Fig. 8, a side view of the connecting-screw of special formation, joining the collar and the contact or knob, of which Fig. 9 is a sectional view; and Fig. 10 shows the gage secured in the tool-post of a lathe and arranged to perform the office of calipers in locating departures from a given diameter at different points of a turned body.

Like numerals refer to like parts throughout all the views.

Considering the drawings, numeral 1 marks the cylindrical gage box or cup provided with a centrally-disposed nipple 2, extending downwardly below the box and upwardly within the box and having an accurately-bored passage for a push-pin 3. That portion of the nipple within the box possesses an open-ended slot 4, and a transverse traveler-bar 5 is passed through the slot 4 and through the push-pin, in which it is secured diametrically. One end of bar 5 engages a vertical guiding-recess 6 in the wall of the box 1, and the other end enters a helical groove 7 in a barrel 8, vertically placed and having its pivots 9 and 10 journaled, respectively, in the bottom of the box and in the bridge-piece 11, secured across the box on its upper edge. It will now be seen that as the push-pin rises in the box the end of bar 5 travels the helical groove 7 and revolves the barrel. The bar rests normally at the bottom of slot 4 in the nipple, limiting the downward movement of the push-pin, and the bar is yieldingly held and steadied by the pressure of the straight and coil spring 12, one extremity of which bears upon the bar, and the remaining end is let into the wall of the box and suitably fastened there, as best shown in Fig. 6. Gear 13 is concentrically fixed to the barrel 8 and meshes with a pinion 14 on an arbor 15, and the arbor has its pivots journaled at the top in bridge-piece 11 and at the bottom in the end of bracket 16, which is secured to the bridge-piece by screw 17, as illustrated in Fig. 5.

Number 18 marks the annular movable casing that encircles the upper portion of the gage-box, an inwardly-projecting flange 19 of the movable casing passing beneath the bulge 20 of the gage-box wall. An annular protuberant extension 21 of movable casing 18 is milled or knurled to afford purchase for the fingers in turning it. It will be noted that the upper edge of casing 18 lies somewhat above the top edge of the box and that points 22 22 are separated from or formed in the top edge of the casing and turned over inwardly to catch the dial 23 and attach it to the movable casing. Ordinarily I place a wire 24 circumferentially within the casing and resting on the top edge of box 1. Attention is called to the fact that bridge-piece 11 has its ends in recesses cut in the top edge of box 1 and its surface flush with that edge. The wire 24 rests upon the edge of the box evenly all around, and when the casing 18 and dial 23 turn together the dial slides easily upon the wire. Dial 23 possesses a central orifice 25, and the upper pivot 26 of arbor 15 extends through the orifice and is joined to pointer 27, which sweeps the dial. A suitable crystal 28 covers the whole and is held to the top edge of the casing by bezel 29. Bezel and crystal turn with the casing 18.

Assuming now that push-pin 3 be moved inwardly, its engagement with the helical groove in the barrel will rotate the latter and by agency of the gear and pinion the pointer or hand will be actuated. The reaction of straight and coil spring 12 will return all the parts to their first positions; but in order that the instrument shall be in the highest degree sensitive and accurate it is essential that the end of bar 5 should be maintained always in contact with the groove and no lost motion or play intervene. To effect this desired condition, I introduce the hair-spring 30 upon arbor 15, its outermost end being secured in a dropped lug 31 of the bridge-piece. (See Fig. 5.) The bar 5 is raised against spring 12 and the gear and pinion rotate against hair-spring 30. Therefore the upper side of helical groove 7 never breaks contact with the bar 5. Extreme care is taken with the formation of the groove, and the extremity of the bar is perfectly smooth.

In the use of the instrument it is desirable that push-pin 3 be not accidentally pressed too far inwardly, and I usually limit it by placing the screw-collar 32 (see Fig. 7) on its lower end. As the pin moves inwardly the collar meets the nipple 2 and halts. A movement of definite length—for example, one-fourth of an inch—may thus be permitted pin 3. Collar 32 also engages the connecting-screw 33, (see Fig. 8,) and the screw is provided with the encircling weakening-groove 34, as drawn. Contact or knob 35 is held upon the lower end of screw 33, and groove 34 lies between contact and collar. It has been found that in ordinary service the contact receives numerous unintentional blows, some of them severe enough to disarrange the mechanism of the gage, or at least to impair its accuracy. I insure the parts against injury by the protective effect of the weakened screw 33, which breaks under a blow of dangerous force, leaving short ends projecting from contact and collar, the threaded seats for the screw in each of those parts being less in depth than the length of half the screw 33, as illustrated. By means of its projecting ends the broken screw is readily removed and a new one is introduced.

I do not confine myself to the exact shape of any of the elements mentioned herein.

The gage-box is usually supported in a stirrup 36, screwed to the end of a wrist 37, (see Fig. 5,) the wrist being connected by a friction-joint 38 to a rod 39, and this rod may be clamped in the customary manner to a pillar 40, adjustably clamped to the base 41 of a surface-gage. My invention may be used in connection with any suitable supporting elements.

Dial 23 (see Fig. 2) is the one most generally employed, although the dial 42 (illustrated in Fig. 3) can be substituted. If the gage is given a range of one-eighth of an inch, the one hundred and twenty-five divisions of dial 42 represent one-thousandths, and a skilful workman by bringing the pointer exactly between two of the lesser division-lines may read in two-thousandths of an inch. Dial 42 indicates increases of diameters or decreasing depth-levels.

Dial 23 indicates both increases and diminutions of diameter or other measurements. Consider Fig. 10, the case of a turned body 43 between the centers of a lathe and the rod 39, secured in the tool-post 44. Let there be any point in the length of the body regarded as of the correct diameter and contact 35 be brought to touch at that place with a slight pressure sufficient, for example, to swing the pointer to mark "5" on dial 23. Now casing 18 and with it the dial may be turned to bring the zero-mark directly beneath the pointer where mark "5" was before. Moving the lathe-carriage 45 along it is thought to be clear that an increase in diameter may be read directly to the right and a decrease to the left of the zero-mark. Differences in the revolving center of a lathe (see Fig. 1) may similarly be detected or variations in the surface of a piece of work 46 on a planer-bed 47 indicated by moving the gage-stand along the bed. (See Fig. 4.) Numerous other uses for the gage present themselves constantly in practice.

Having thus described my invention and explained its operation and use, what I claim is—

1. In an indicating surface-gage, the combination of a gage-box, a push-pin movable through the bottom of the said box and means adapted to guide the said pin, a dial, a pointer arranged to sweep the dial and devices constructed to support the pointer and to transmit and transform the reciprocative movement of the said pin to the sweeping movement of the pointer, and a projecting rod secured to the said gage-box and having a friction-joint, substantially as described.

2. In an indicating surface-gage, the combination of a cylindrical gage-box closed at the bottom, a guided push-pin movable through the bottom, a dial closing the top of said cylindrical gage-box, a pointer adapted to sweep the dial and devices operated by said push-pin and arranged to support and actuate the pointer, a rod attached radially to the said cylindrical gage-box and having a friction-joint, a supporting-stand, and means for securing the said rod upon the stand at any height and adapted to permit the adjustment of the rod horizontally, vertically and rotatively, the said friction-joint allowing the gage-box to be moved toward or from the work after adjustment of the said rod whereby the said push-pin may be brought into or out of pressure-contact with the work to be gaged, substantially as described.

3. In an indicating surface-gage, the combination of a cylindrical gage-box closed at the bottom, a guided push-pin movable through the bottom, a dial closing the top of said cylindrical gage-box, a pointer adapted to sweep the dial and devices operated by said push-pin and arranged to support and actuate the pointer, a rod attached radially to the said cylindrical gage-box and having a friction-joint, a base-block, an inclinable pillar 40, means for securing the pillar upon the block, and devices for securing the said rod to the pillar at any point of its length and adapted to permit the adjustment of the rod horizontally, vertically and rotatively, the said friction-joint allowing the gage-box to be moved toward or from the work after adjustment of the said rod whereby the said push-pin may be brought into or out of pressure-contact with the work to be gaged, substantially as described.

4. In an indicating surface-gage, the combination of a gage-box, a reciprocating push-pin entering the said box centrally and means for guiding the pin, a movable casing, a dial secured within the casing and movable with it, a revoluble barrel having its axis vertical and situated eccentrically, said barrel having a helical groove, a bar projecting from the push-pin and engaging the said groove whereby the said barrel is rotated by the movements of the said push-pin, a pointer upon the dial, and mechanism connecting the said barrel and pointer, substantially as described.

5. In an indicating surface-gage, the combination of a gage-box, a push-pin entering the said box centrally and means for guiding the pin, a bar diametrically secured to said pin within the box, a revoluble barrel vertically and eccentrically disposed and possessing a helical groove engaging the end of said bar whereby the movement of said pin rotates the barrel, a dial supported upon the gage-box, a pointer adapted to sweep the dial, mechanism constructed and arranged to transmit motion from said barrel to said pointer, and a spring incorporated with said mechanism and yieldingly maintaining constant contact between said helical groove and the said bar.

6. In an indicating surface-gage, the combination of a gage-box, a push-pin entering the said box and means for guiding the pin, a bar diametrically secured to said pin within the box, a revoluble barrel vertically disposed and possessing a helical groove engaging the end of said bar whereby the movement of said pin rotates the barrel, a gear-wheel concentrically fixed on the barrel, a pinion meshing with said gear-wheel, an arbor secured centrally through the pinion, a dial supported upon the gage-box, the said arbor passing centrally through the said dial, a pointer attached to the arbor and adapted to sweep the dial, and a spring acting upon the arbor and through the pinion and gear-wheel maintaining a constant yielding contact of said helical groove in the barrel and the end of said bar.

7. In an indicating surface-gage, the combination of a gage-box having an interior vertical recess, a cylindrical push-pin entering the said box and means for guiding the pin, a bar diametrically secured through the pin within the box, a revoluble barrel possessing a helical groove engaging one end of said bar whereby the movement of said pin rotates the barrel, the remaining end of said bar engaging the vertical recess in the box and preventing rotation of said push-pin, a gear-wheel concentrically fixed on the barrel, a pinion meshing with said gear-wheel, an arbor secured centrally through the pinion, a dial supported upon the gage-box, the said arbor passing centrally through the said dial, a pointer attached to the arbor and adapted to sweep the dial, a spring pressing the said bar downwardly, and a second spring acting upon the arbor and through the pinion and gear-wheel maintaining a constant yielding contact of said helical groove in the barrel and the end of said bar.

8. In an indicating surface-gage, the combination of a push-pin, a dial, a pointer, mechanism constructed and arranged to transmit the motion of the pin to the pointer, a contact-knob, a weakened screw engaging the knob, and devices for joining the said weakened screw and said push-pin.

9. In an indicating surface-gage, the combination of a push-pin, a dial, a pointer, mechanism constructed and arranged to transmit the motion of the pin to the pointer, a screw-collar engaging the end of said push-pin and limiting its inward movement, a contact-knob, and a screw having a groove cut around its middle to weaken it, said screw being tapped into said collar and said knob, substantially as described.

In testimony whereof I affix my signature in presence of two witnesses.

WILLIAM HARRY REISNER.

Witnesses:
A. H. GUNNELL,
D. C. GILBERT.